United States Patent
Nygard

(10) Patent No.: US 7,701,950 B2
(45) Date of Patent: Apr. 20, 2010

(54) HETEROGENEOUS, ROLE BASED, ENTERPRISE PRIORITY MANAGER

(75) Inventor: Craig Nygard, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 925 days.

(21) Appl. No.: 11/501,494

(22) Filed: Aug. 8, 2006

(65) Prior Publication Data

US 2008/0040457 A1    Feb. 14, 2008

(51) Int. Cl.
  *H04L 12/28* (2006.01)
(52) U.S. Cl. .................................................. 370/395.42
(58) Field of Classification Search ................. 370/230, 370/395.42; 709/220, 223
  See application file for complete search history.

(56) References Cited

U.S. PATENT DOCUMENTS

| | | | |
|---|---|---|---|
| 4,642,756 A | 2/1987 | Sherrod | 364/200 |
| 5,369,570 A | 11/1994 | Parad | 364/401 |
| 6,115,640 A * | 9/2000 | Tarumi | 700/99 |
| 6,408,277 B1 | 6/2002 | Nelken | 705/9 |
| 6,618,730 B1 | 9/2003 | Poulter et al. | 707/102 |
| 6,640,230 B1 | 10/2003 | Alexander et al. | 707/10 |
| 2004/0139448 A1 | 7/2004 | Hope et al. | 719/318 |
| 2004/0148299 A1* | 7/2004 | Teegan et al. | 707/100 |

* cited by examiner

*Primary Examiner*—Kwang B Yao
*Assistant Examiner*—Jung-Jen Liu
(74) *Attorney, Agent, or Firm*—Arthur Samodovitz; Law Office of Jim Boice

(57) ABSTRACT

Prioritizing workload and tasks by first determining if a prioritization state change is necessary, and if so setting priorities to change the prioritization state, and if not examining prioritization state determining inputs, calculating new prioritization states, and updating prioritization states. Next interrupts are processes and prioritization states are updates. The resulting settings and prioritization states are examines, new prioritization states calculated, the new prioritization states compared with existing prioritization states, and the prioritization states changed as a function of present prioritization states and calculated new prioritization states. As a last step either a new prioritization state is set and saved, or the existing prioritization states saved.

18 Claims, 12 Drawing Sheets

HETEROGENEOUS, ROLE BASED, ENTERPRISE PRIORITY MANAGER

BACKGROUND

1. Field of the Invention

The invention relates to a computer program product and computerized method and system for the systematic and scientific analysis and evaluation for the programmed prioritization and scheduling of tasks or resources to an individual or group to accomplish competing tasks.

2. Background Art

Many individuals and most knowledge workers in today's society and economy must balance the priorities of tasks that compete for limited time and resources against deadlines. These many individuals and most knowledge workers have access to a variety of personal productivity devices, from personal digital assistants (PDAs) (typically integrated with cellular telephones), sophisticated cell phones, personal computers, and networked personal computers.

These individuals, especially the knowledge workers among them, interact with networked demands and tools and time dependent, prioritizable activities, for example, with financial institutions and transactions (on line banking, billing, bill paying, accounts payable scheduling and ordering, and stock transactions), health care providers (appointment scheduling, prescription management, e-mails to and from providers), and personal issues (birthdays, anniversaries. These same individuals frequently work with or otherwise interact with a variety of traditional applications (for example—general ledger, expense accounting, purchasing, problem management, or personnel systems), workflow, or calendar based applications that automate some of the operations of the enterprise or institutions.

The point of view of most designers of the traditional, workflow, or calendar based applications used by these enterprises and institutions has heretofore been limited. The designers typically see the application as single focused for the provider's application and the user's specific interaction or set of interactions with the provider. Therefore queues and prioritization schemes that implement the enterprise goals within the application are performed in isolation from other enterprise applications as well as from the user's other needs, tasks, and priorities. Consequently, the user, typically a cross-application knowledge worker, is constantly juggling competing priorities.

Most enterprises have responded to this state of affairs by using a de facto single point of contact to drive employees toward priorities associated with enterprise goals. That single point of contact is generally an e-mail interface, frequently an interface to collaboration tools, scheduling tools, and e-mail. However, the e-mail interface was never designed for use as a prioritization and dynamic scheduling tool.

Consequently, the user is presented with a proxy for enterprise goals through poor lenses when the uncorrelated priorities set by the individual user's wants and needs are divorced from enterprise goals and even more distant from the user's capabilities to respond on time.

This goes beyond mere workflow management and calendar management applications, which receive only limited input from heterogeneous applications in their native application context, and do not support inputs from users or users' colleagues.

Thus, there is need for the systematic and scientific analysis and evaluation of end user task scheduling through the programmed prioritization and scheduling of tasks or resources of an individual or group to accomplish competing tasks, preferable on time.

There is a further need for the programmed prioritization and scheduling of tasks or resources to assess the range of tasks, priorities, assess capacities, and provide responses, especially responses consistent with enterprise objectives.

SUMMARY

The method, system, and program product of the invention synthesizes cross-application and cross-platform enterprise commitments, provides a mechanism for entering those enterprise commitments at the enterprise, departmental, and personal goal layer levels, provide context switching to move precisely to a desired environment, and accomplish these tasks while respecting a user's individual work state with, for example, semi-pervious interrupt filters.

This is accomplished by a computer based system, which may be networked or off-line (at the time of use), providing the following four functions in an enterprise environment:
1. Priority based automation to identify and support an individual's commitments to one or more of enterprise, workgroup, and personal goals.
2. Dynamic context switching.
3. Disparate application integration to provide cross application commitment management.
4. Workstation automation to support prioritization of enterprise, workgroup, and individual goals.

At a high level, the above is accomplished in a heterogeneous, personal prioritization manager by a process of
   a) determining if a prioritization state change is necessary, and if so setting priorities to change the prioritization state, else examining prioritization state determining inputs, calculating new prioritization states; and updating prioritization states;
   b) processing interrupts and updating prioritization states;
   c) examining present settings and prioritization states, calculating new prioritization states, comparing the new prioritization states with existing prioritization states, and changing prioritization states as a function of present prioritization states and calculated new prioritization states; and
   d) either forcing a new prioritization state, or saving existing prioritization states and roles and saving the prioritization state.

THE FIGURES

Various aspects of the invention are illustrated in the Figures attached hereto.

FIG. 3 illustrates the initialization of the system states.

FIG. 4 illustrates initialization of variables, saved states, and roles.

FIG. 5 illustrates the logic of selecting the state and collecting and initially processing the state determining real inputs.

FIG. 6 illustrates the logic of processing real time interrupts and interrupts from real time devices.

FIG. 7 illustrates a logic table or "change engine" for changing state role based on an examination of present settings and priorities, calculated priorities, and comparing suggested priorities against the existing priorities to set new priorities.

FIG. 8 illustrates the logic for implementing a change in context.

FIG. 9 illustrates the logic for implementing a shut down.

DETAILED DESCRIPTION

The method, system, and program product of the invention synthesizes cross-application and cross-platform enterprise or inter-enterprise commitments, to provide a mechanism for entering those commitments at one or more of the enterprise, departmental, and personal goal layer levels, provide context switching to move precisely to a desired environment, and accomplish these tasks while respecting a user's individual work state with, for example, semi-pervious interrupt filters.

Figure 1:
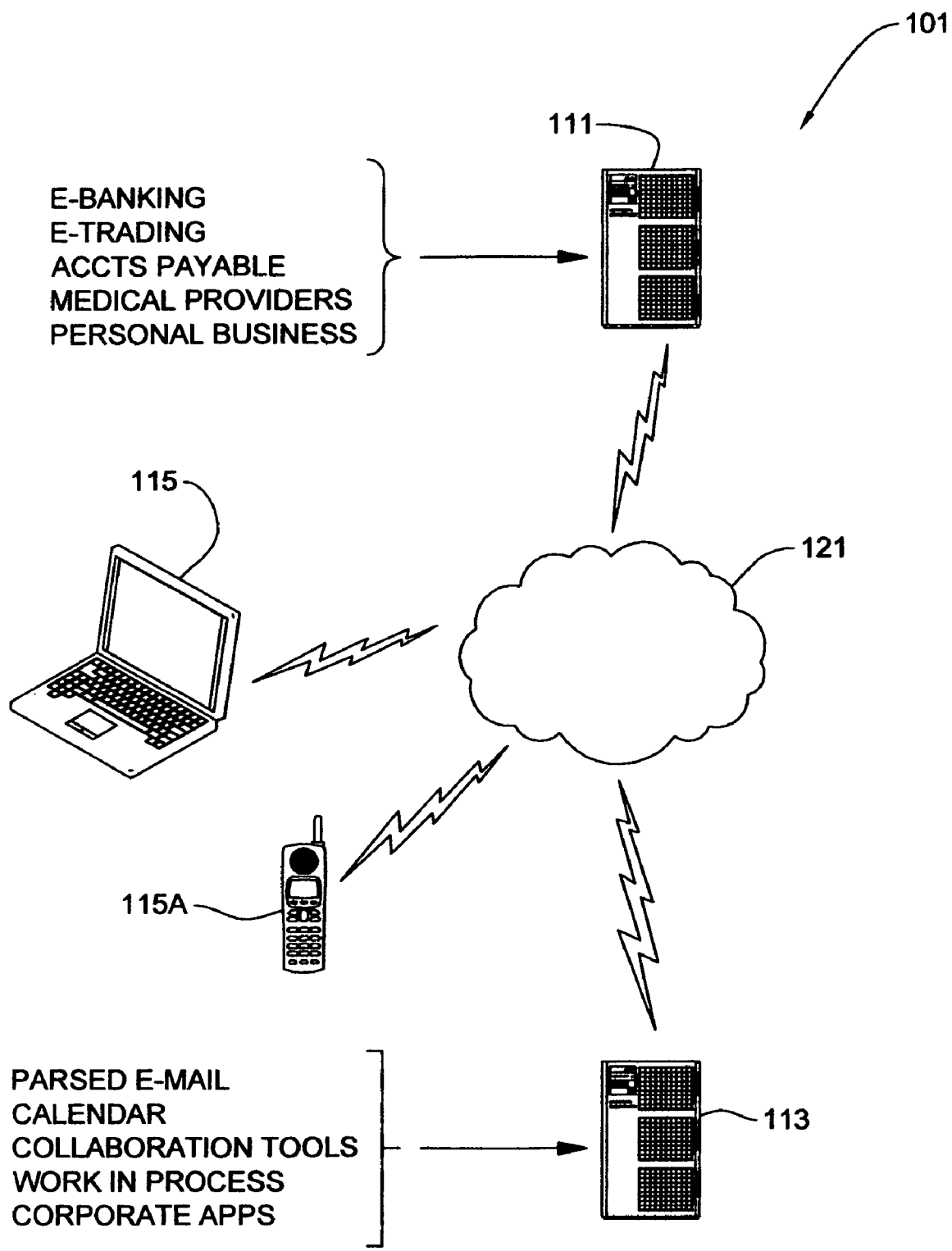
FIG. 1 shows a networked terminal (and/or PDA), receiving network inputs from an enterprise server (including enterprise calendars and enterprise e-mail), and from other claimants, (such as financial institutions, merchants, health care providers, personal e-mail, personal calendars, departmental or enterprise applications and to-do lists).

This is accomplished by a computer based system, which may be networked or off-line, as shown in FIG. 1. The system 101 shown in FIG. 1 includes two servers 111 and 113 and a user terminal 115, connected through a network 121. Server 111 is representative of external servers and inputs, for example for electronic banking, electronic bill paying (including amounts due, due dates, prompt payment discounts, late payment penalties), electronic stock trading, personal information (anniversaries, birthdays, etc.), health care information (including prescription renewals and refills, appointment scheduling, medical e-mail). Server 113 represents enterprise servers for e-mail, parsed e-mail, collaborative applications and tools, work in progress, collaboration work in progress, traditional applications (purchasing, personnel, expense, problem management), management directed goals and priorities, and the like). Terminal 115 provides for inputs from a user and outputs to the user. As used herein the "terminal" may additionally or alternatively be a cell phone or personal digital assistant 115A. The terminal or PDA/cell phone includes a processor, memory, and input/output, where the priority manager may be resident on terminal 115, for example in non-volatile memory.

The network 121 may be a local area network, a wide area network, a TCP/IP internet network, and it may be wired or wireless.

The system 101 shown in FIG. 1 provides the following four functions in an enterprise environment:
1. Priority based automation to identify and support an individual's commitments to one or more of enterprise, workgroup, and personal goals.
2. Dynamic context switching.
3. Disparate application integration to provide cross application commitment management.
4. Workstation automation to support prioritization of enterprise, workgroup, and individual goals.

Figure 2:
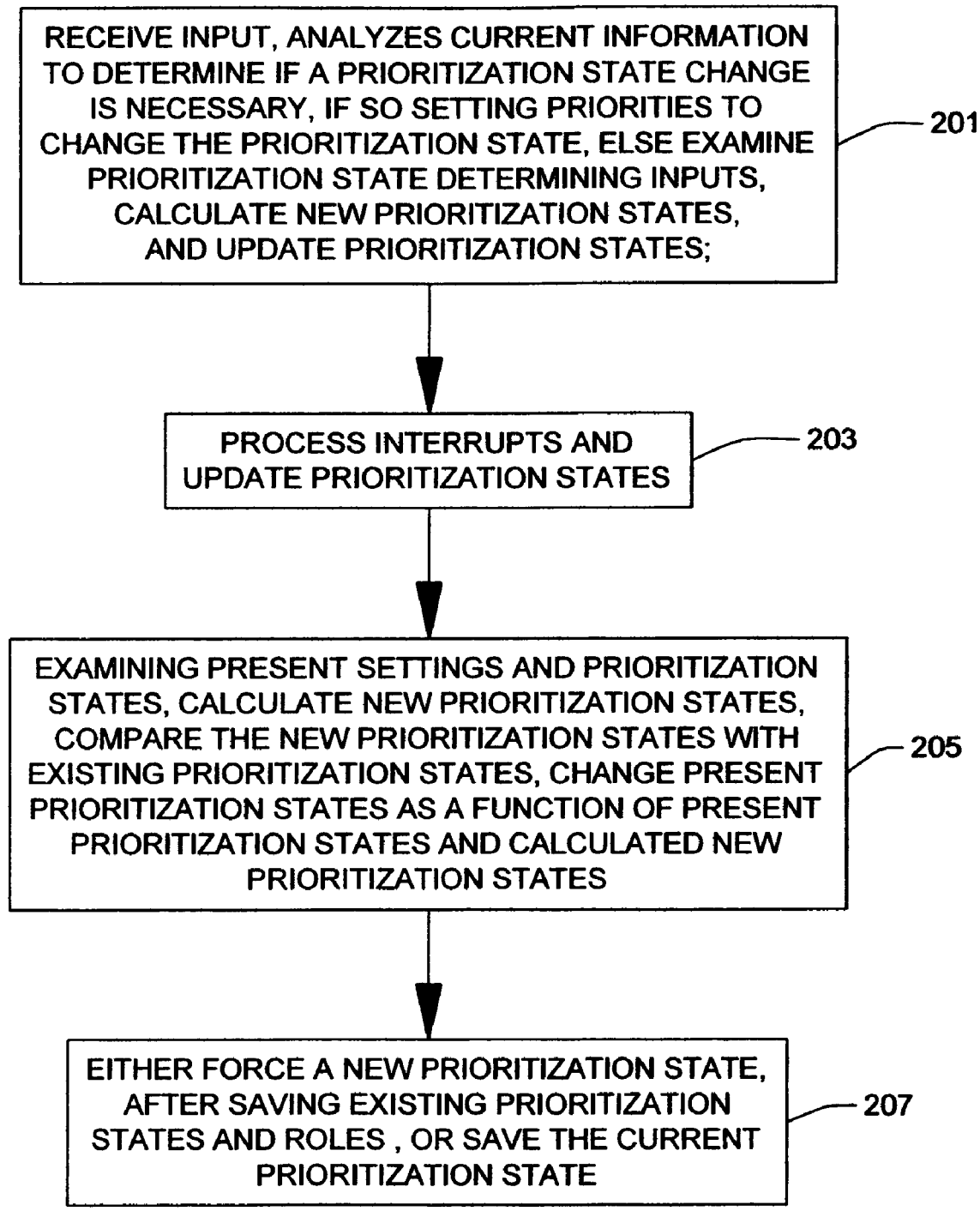
FIG. 2 illustrates a high level flow chart of the method of the invention.

In one embodiment, the system 101 shown in FIG. 1 generally utilizes a method as shown at a high level in FIG. 2, with the following steps:

a) The first step, step 201, is determining if a prioritization state change is necessary, and if so setting priorities to change the prioritization state, else examining prioritization state determining inputs, calculating new prioritization states, and updating prioritization states.

b) The second step 203 is processing interrupts and updating prioritization states.

c) The third step, step 205, is examining present settings and prioritization states, calculating new prioritization states, comparing the new prioritization states with existing prioritization states, and changing prioritization states as a function of present prioritization states and calculated new prioritization states.

d) The last step, step 207, either forcing a new prioritization state, after saving existing prioritization states and roles, or saving the prioritization state.

Figure 3:
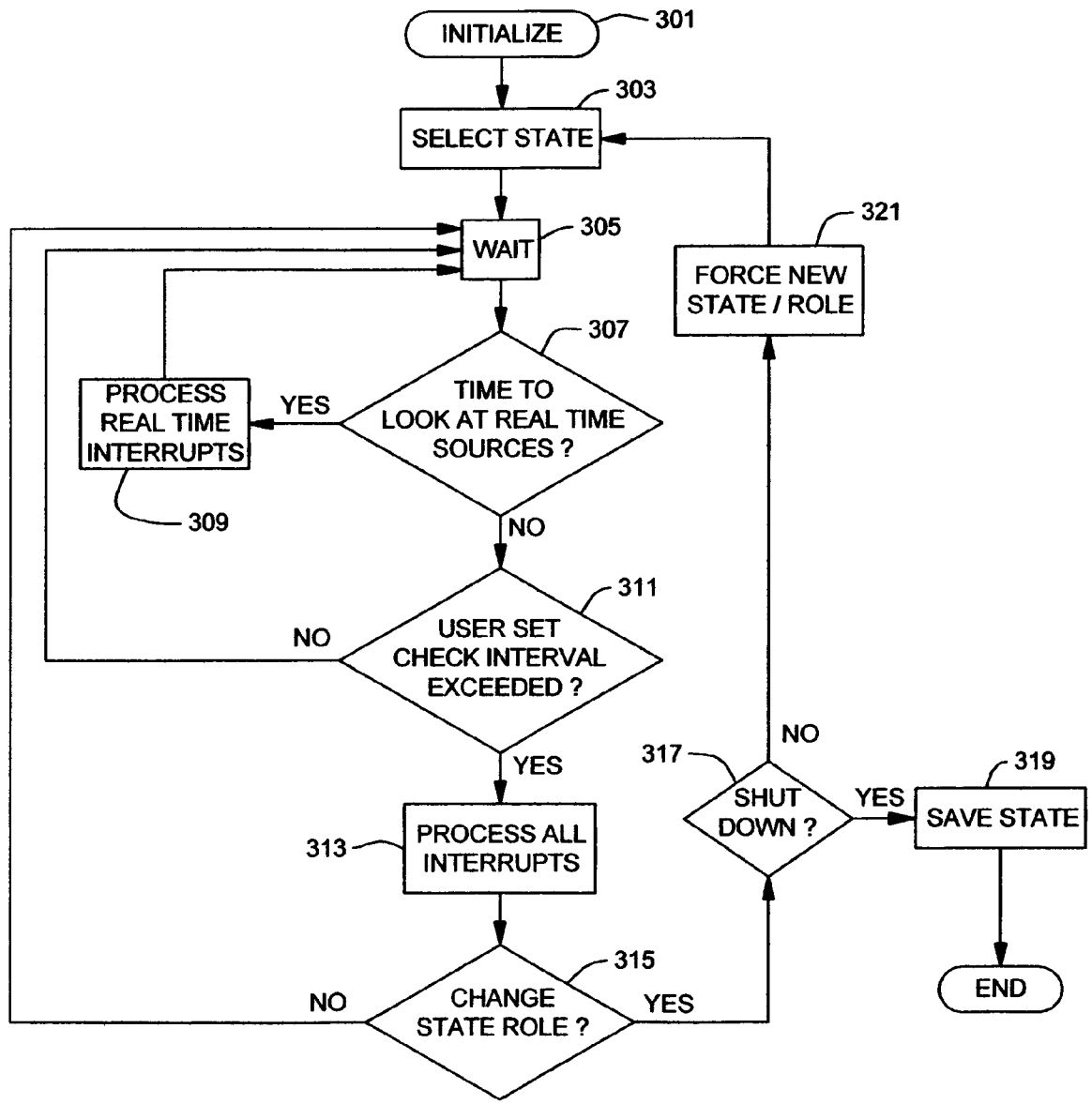
FIGS. 3-9 illustrate detailed flow charts of one specific embodiment of the method of the invention.

The method is illustrated in greater detail in FIGS. 3 through 10. FIG. 3 illustrates the initialization 301 of the system states, with the selection of a state 303, a wait 305, testing to see if real time interrupts should be examined 307 and if so, processing real time interrupts 309. Otherwise the user set check interval is tested 311 and if so, all interrupts are processed 313. The process is repeated if the state roles are not to be changed 315. Otherwise the process of setting the state is tested for shutting down the steps of changing the state and saving the state 317 and saving the state 319. Otherwise a new state is forced.

Figure 4:
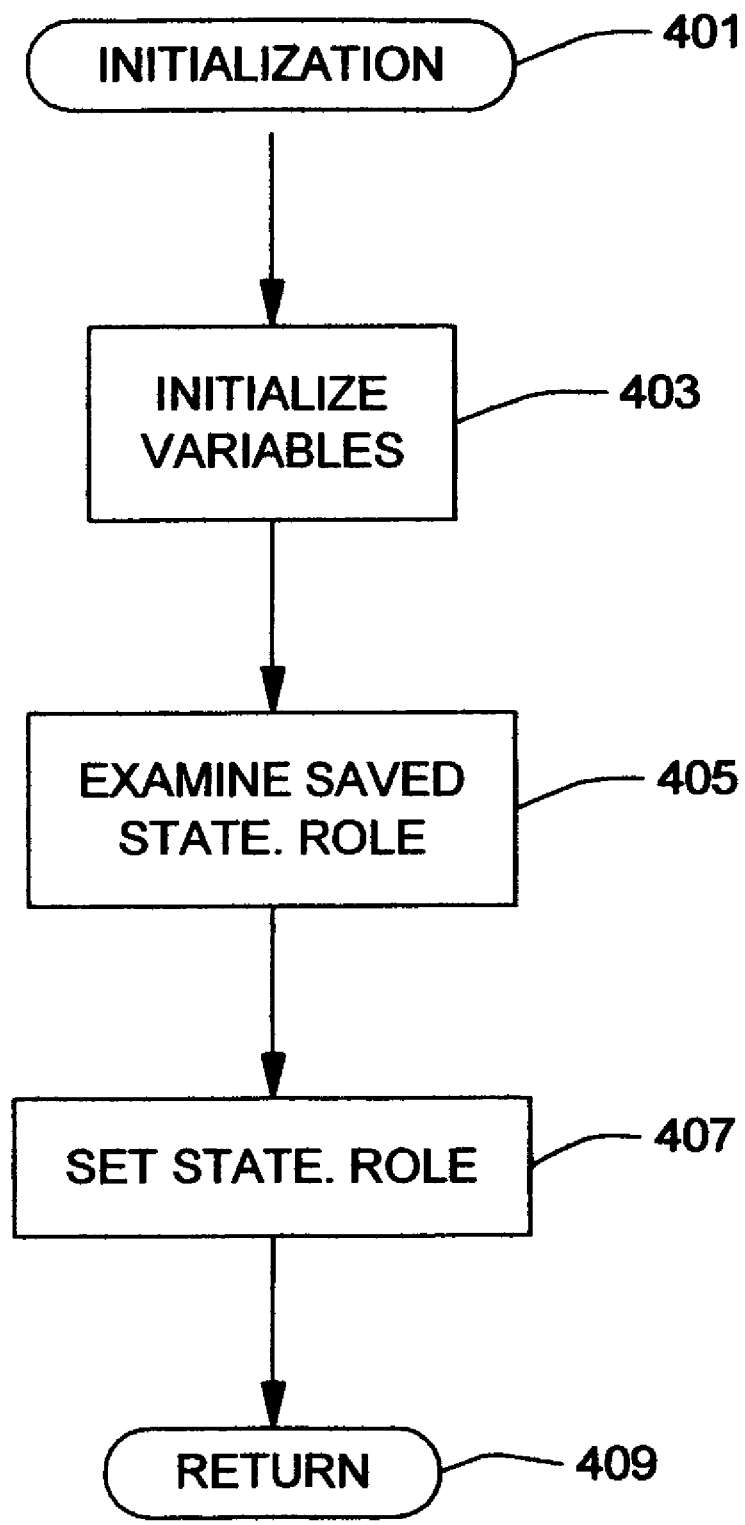

FIG. 4 illustrates initialization 401 of variables 403, saved states, and roles 405, setting states and roles 407, and returning control 409.

Figure 5:
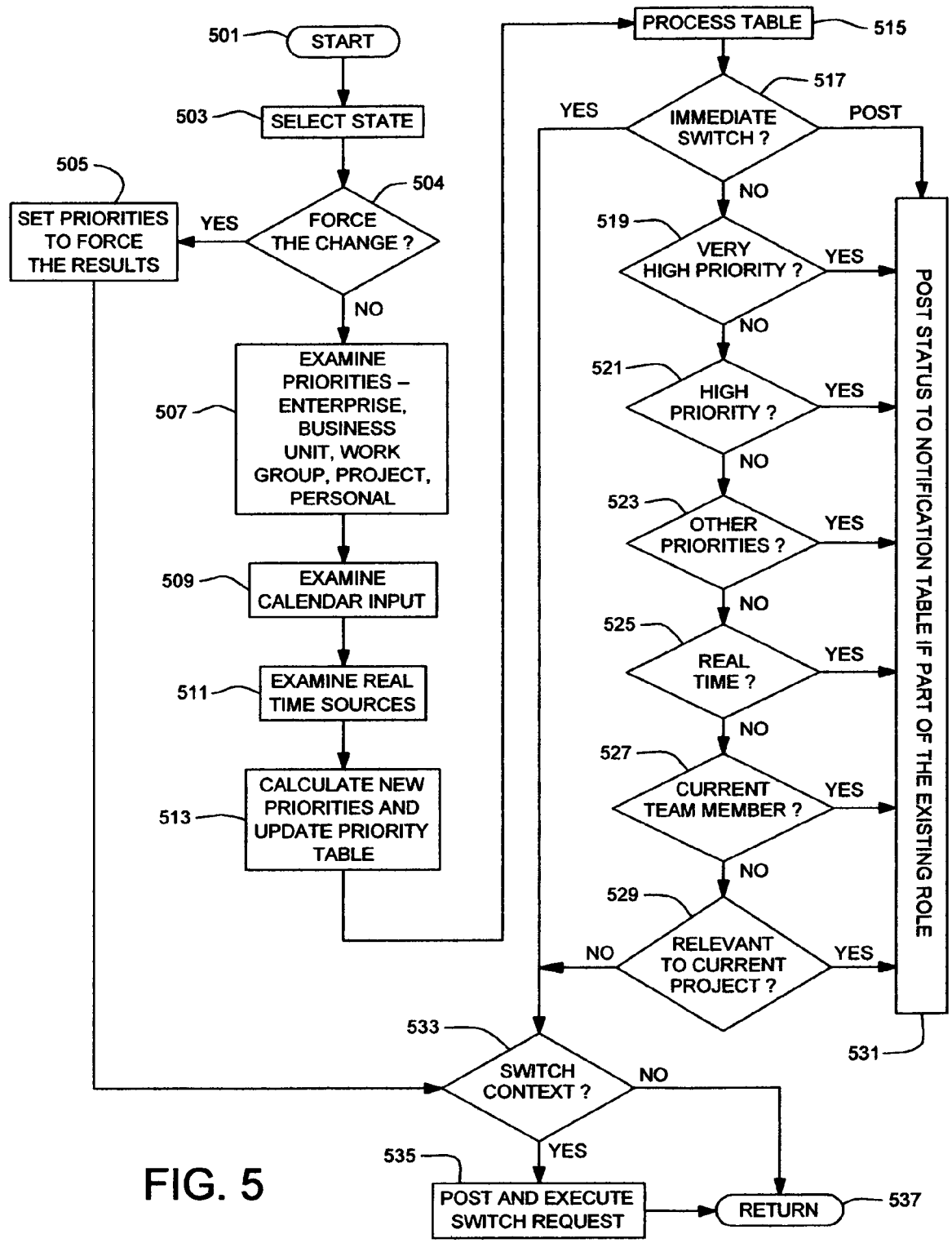
Figure 7:
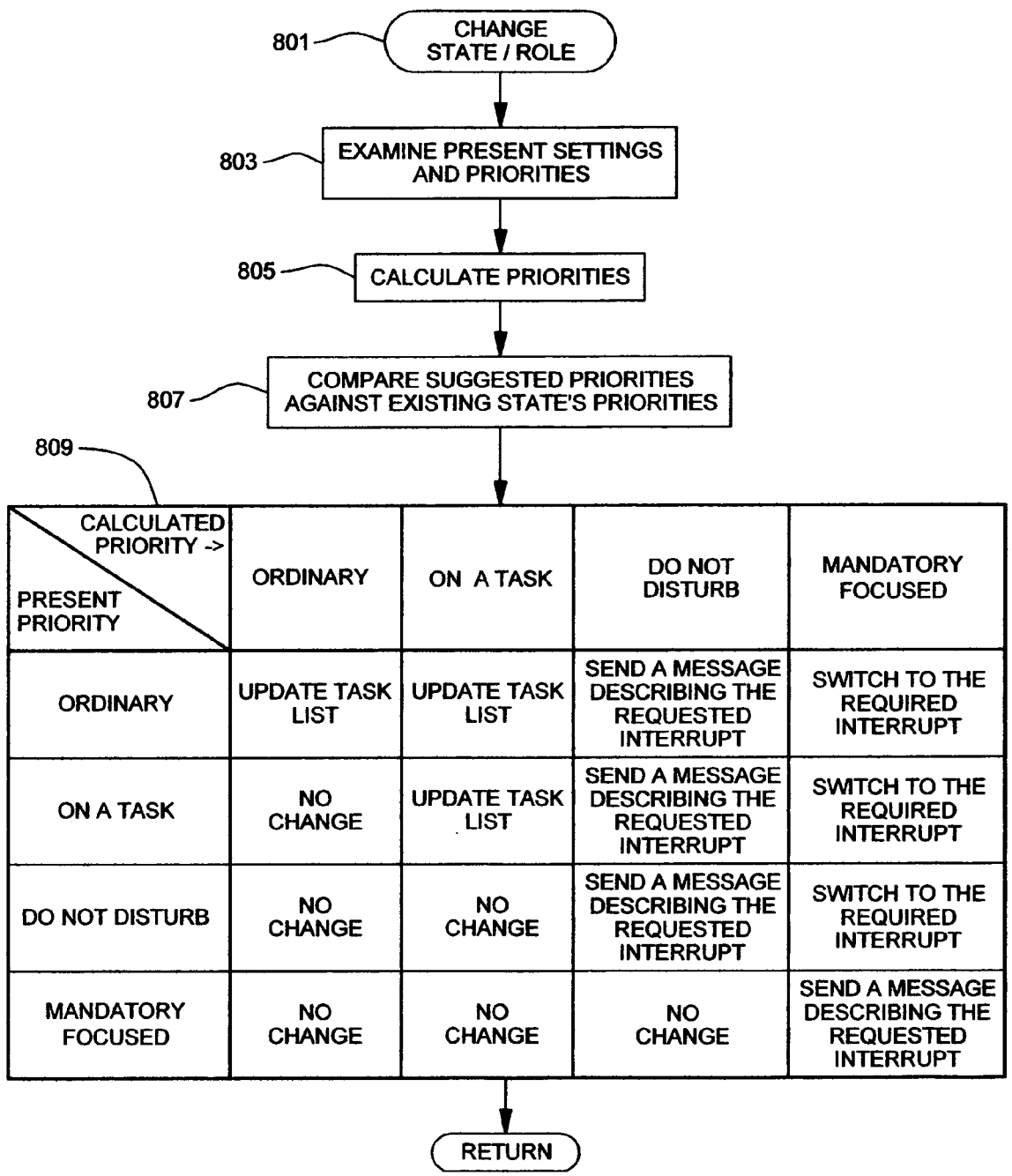

FIG. 5 illustrates the logic 501 of selecting the state 503 and collecting and initially processing the state determining real inputs, that is, testing for a forced change 504 and either setting priorities to force results 505, or beginning the examination priorities across the input universe 507, extracting calendar inputs 509, examining real time sources 511, and calculating new priorities to update the priority table of FIG. 7, 513. The priority table is processed 515. If there are immediate matches 517 this is posted to the Table of FIG. 7. The calculated priorities 513 are then check for very high priorities 519, high priorities, other priorities 521, other priorities 523, real time 525, current team member 527 (relevancy of this state to this user) or relevant to this project 529 the status is posted to the status table 531. The context is tested 533 for switching and if so the status is posted and the status switched 535. Control is then returned 537.

Figure 6:
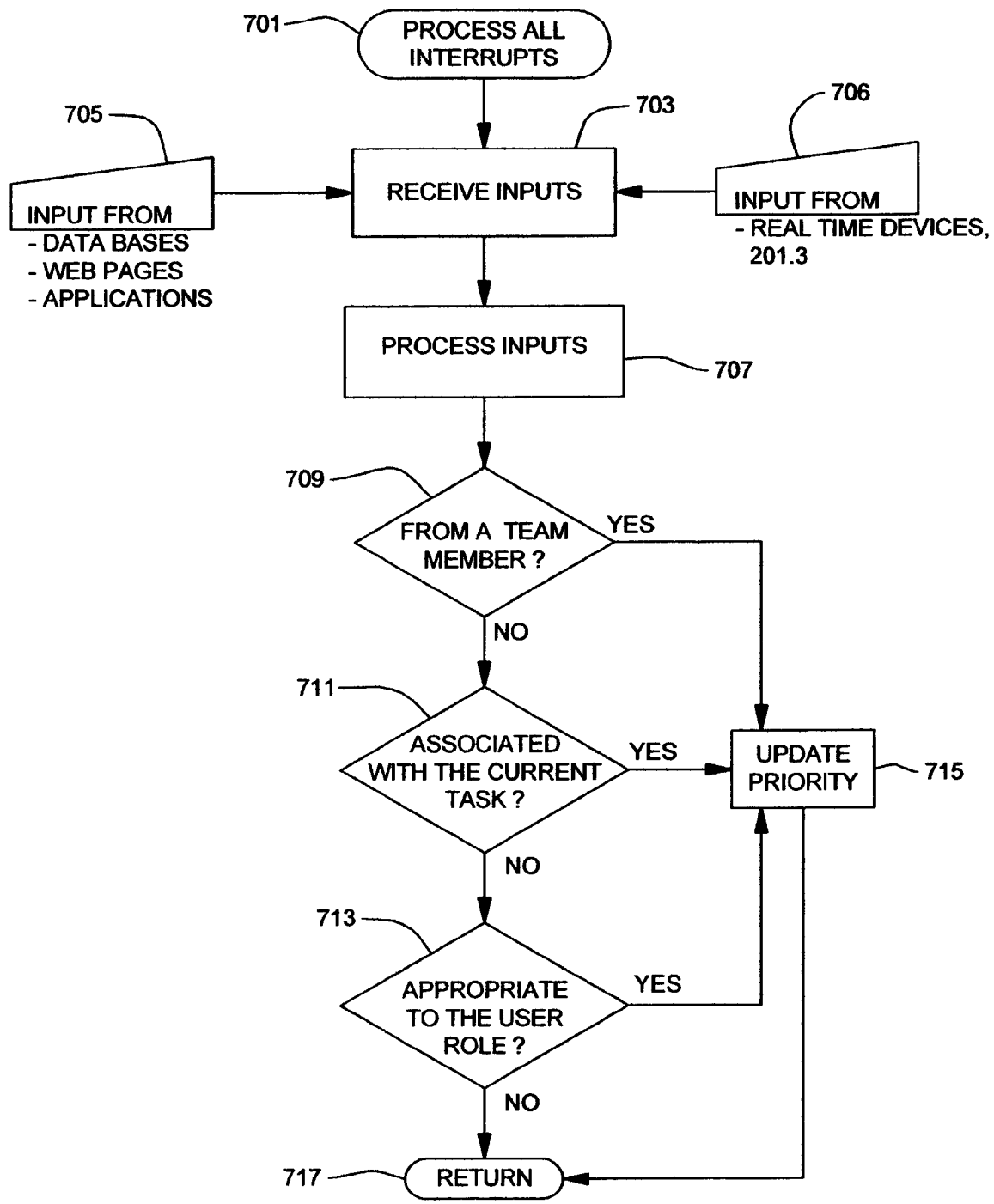

FIG. 6 illustrates the logic of processing real time interrupts 701. Inputs are received 703, for example from IP phones, e-mail, instant messages, video calls, and the like 705 and from real time devices 706. The inputs are processed 707 to see if from a team member 709, or associated with the current task 711, or appropriate to the role 713. If so, the priority is updated 715. In either case control is returned 717.

FIG. 7 illustrates a logic table for changing state role 801 based on an examination of present settings and priorities 803, calculated priorities 805, and comparing suggested priorities against the existing priorities to set new priorities 807 in accordance with table 809. Control is then returned 811.

The logic of table 809 is as follows:
1) if the present prioritization state is ordinary and the calculated prioritization state is ordinary then updating the task list;
2) if the present prioritization state is on a task and the calculated prioritization state is ordinary then no change;

3) if the present prioritization state is do not disturb and the calculated prioritization state is ordinary then no change;
4) if the present prioritization state is mandatory focused and the calculated prioritization state is ordinary then no change;
5) if the present prioritization state is ordinary and the calculated prioritization state is on a task then updating the task list;
6) if the present prioritization state is on a task and the calculated prioritization state is on a task then updating task list;
7) if the present prioritization state is do not disturb and the calculated prioritization state is on a task then no change;
8) if the present prioritization state is mandatory focused and the calculated prioritization state is on a task then no change;
9) if the present prioritization state is ordinary and the calculated prioritization state is do not disturb then send a message describing the requested interrupt;
10) if the present prioritization state is on a task and the calculated prioritization state is do not disturb then send a message describing the requested interrupt;
11) if the present prioritization state is do not disturb and the calculated prioritization state is do not disturb then send a message describing the requested interrupt;
12) if the present prioritization state is mandatory focused and the calculated prioritization state is do not disturb then no change;
13) if the present prioritization state is ordinary and the calculated prioritization state is mandatory focused then switch to the required interrupt;
14) if the present prioritization state is on a task and the calculated prioritization state is mandatory focused then switch to the required interrupt;
15) if the present prioritization state is do not disturb and the calculated prioritization state is mandatory focused then switch to the required interrupt; and
16) if the present prioritization state is mandatory focused and the calculated prioritization state is mandatory focused then send a message describing the requested interrupt.

This logic, referred to as a "change engine" may be implemented as a state machine, or as "if-then" rules or using combinatorial logic.

Figure 8:
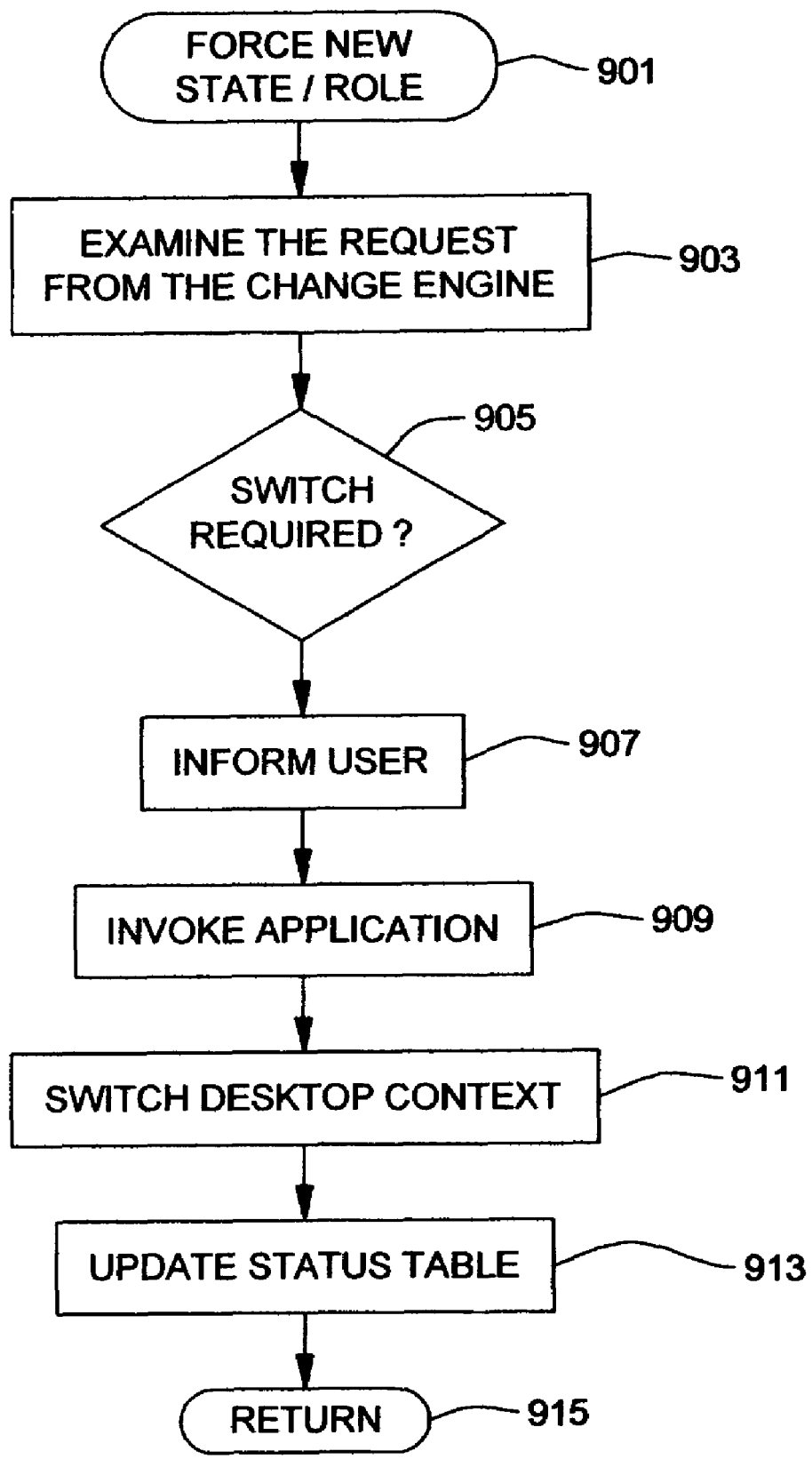

FIG. 8 illustrates the logic for implementing a change in context. 901 by examining the output (request) from the change engine (FIG. 7) 903, determining if a change is requested 905, informing the user 907, invoking an application to effect the change 909, switching desktop context 911, updating status tables 913, and returning control 915.

Figure 9:
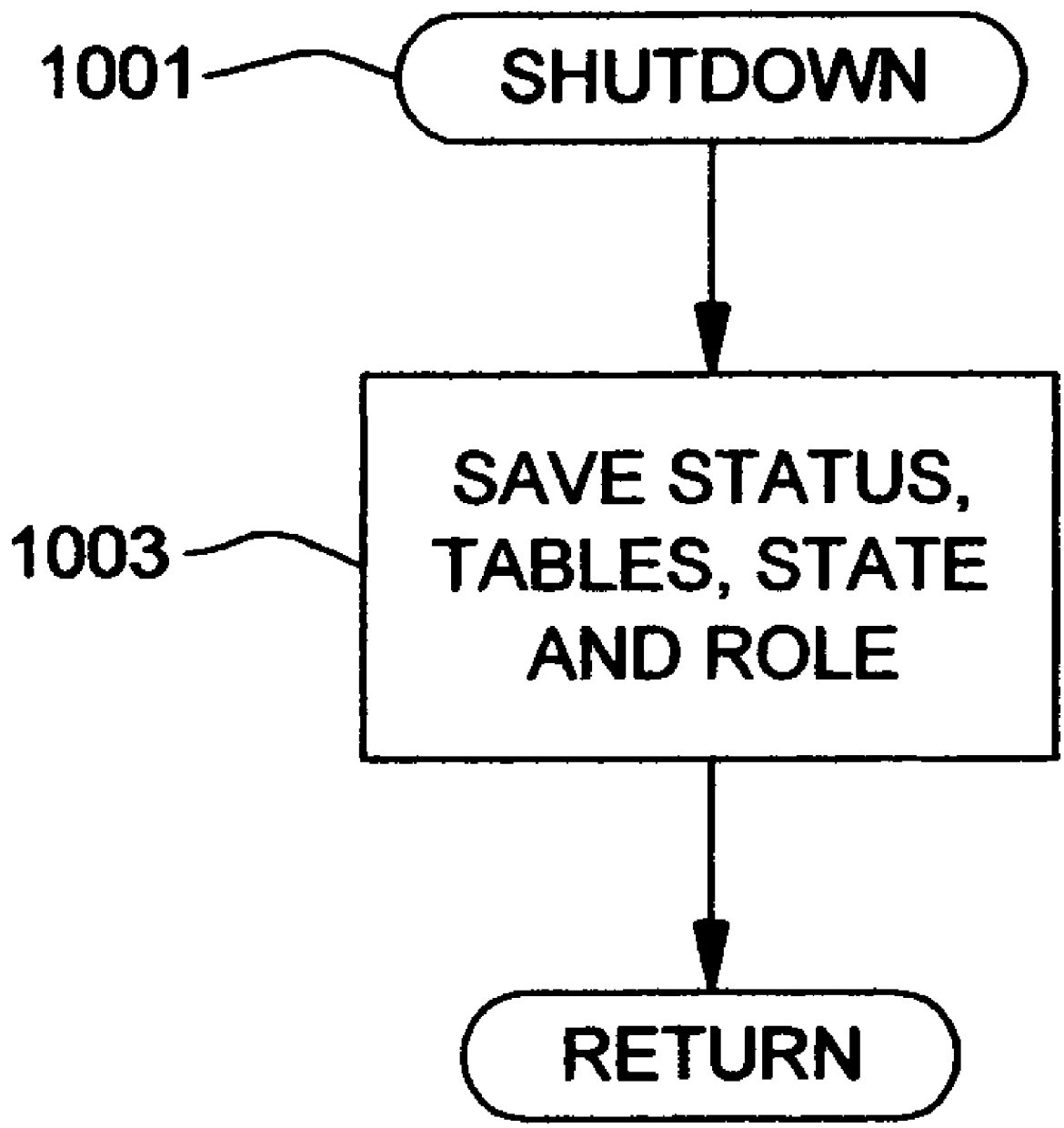

FIG. 9 illustrates the logic for implementing a shut down 1001 by saving the status tables, states, and roles 1003 and returning control 1005.

This invention is intended to operate on an Intel or Unix family (including the latest Macintoshes) processor. It is also intended to be implemented at a layer that is possible to integrate onto many popular desktop operating systems, including Microsoft Windows 2000, Microsoft Windows XP, Unix or Linux and Mac OS. Significant functions, such as alerting, may be deployed with advantage on various wireless handheld devices—cell phones, PDAs, Smart Phones and the like) Finally, as an implementation choice, Citrix' Metaframe servers could deliver this invention to any of their target environments.

Figure 10:
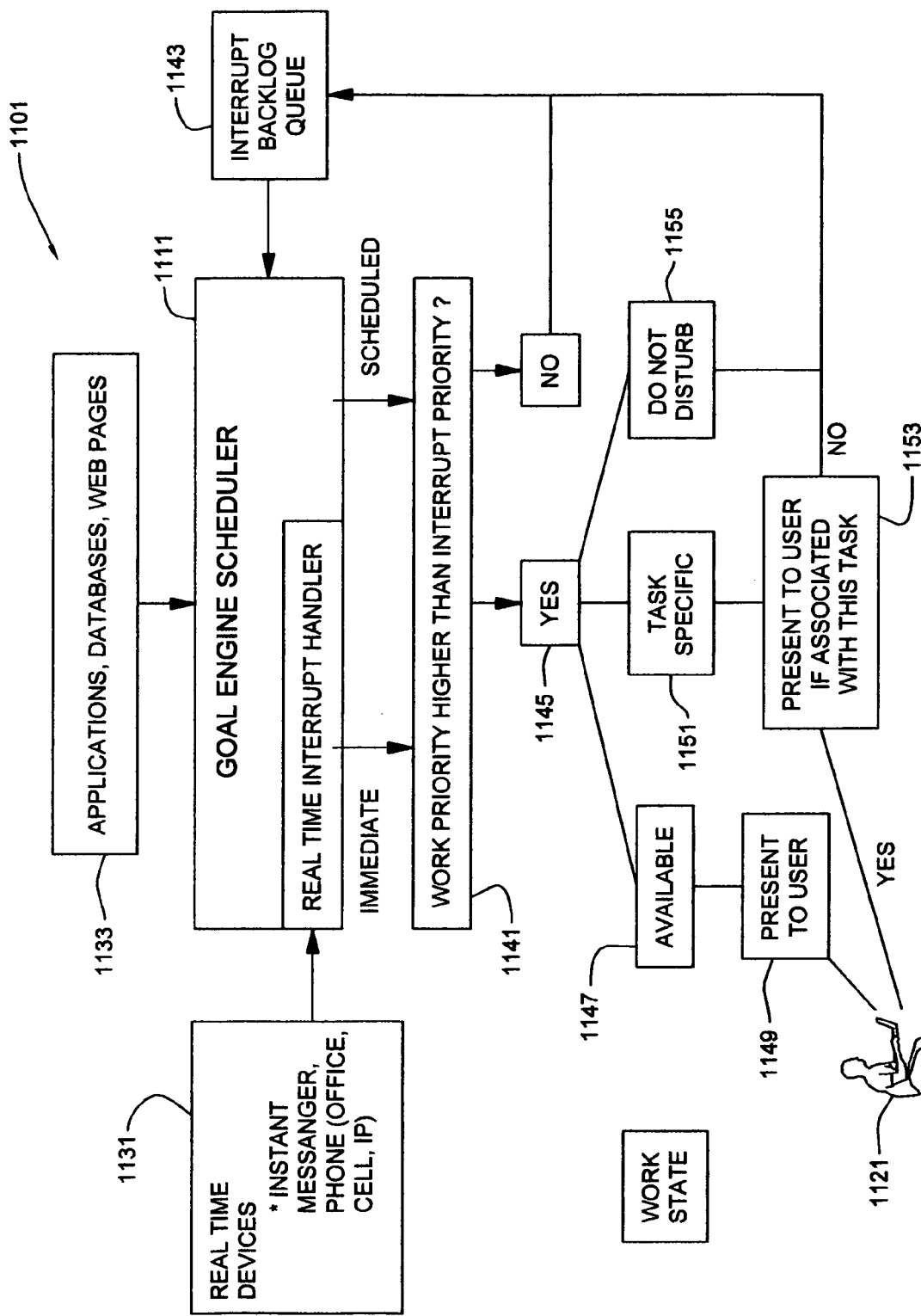
FIG. 10 is a flow chart of overall application flow.
Figure 11:
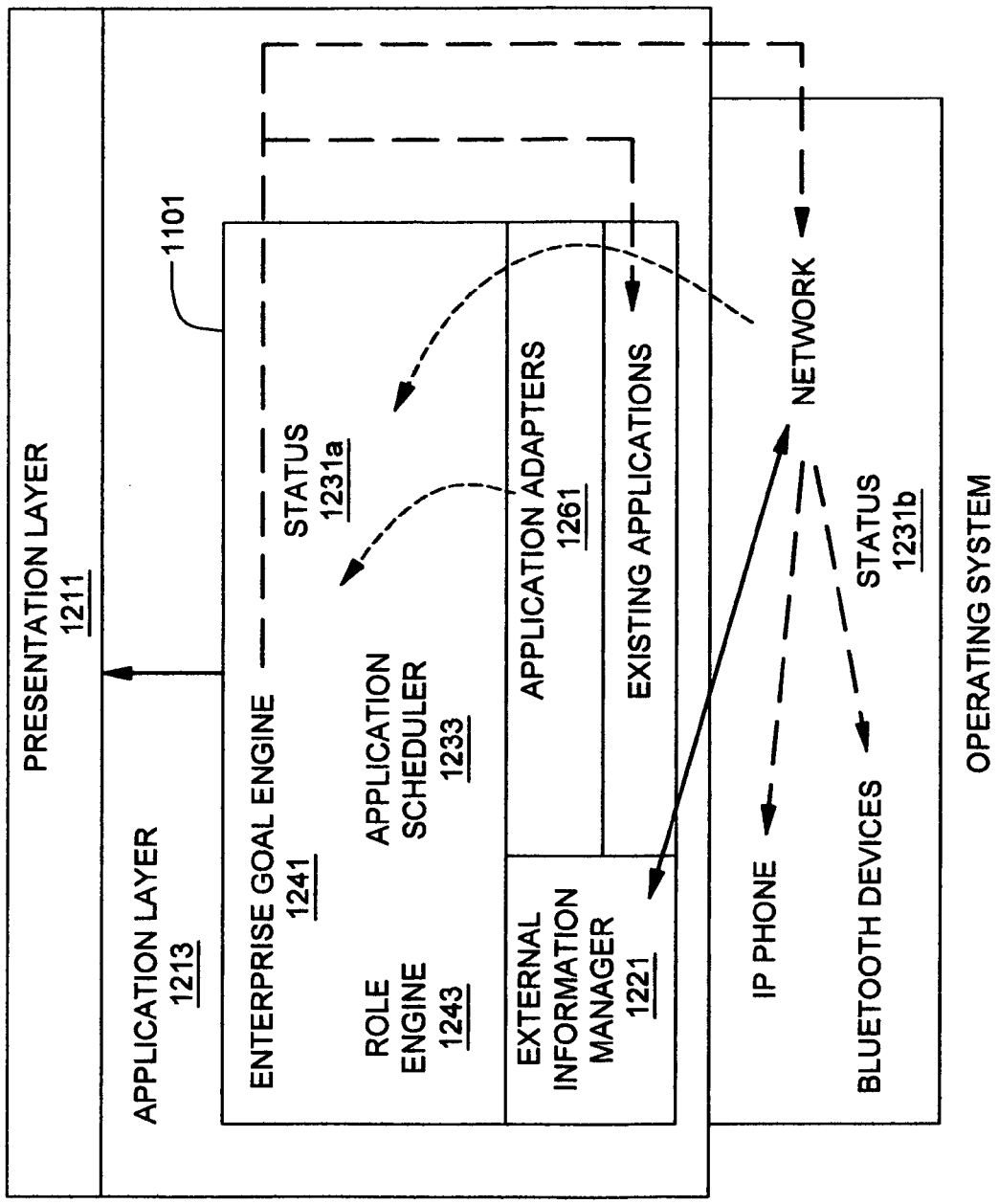
FIG. 11 illustrates the integration of heterogeneous personal devices into the goal engine's direction.
Figure 12:
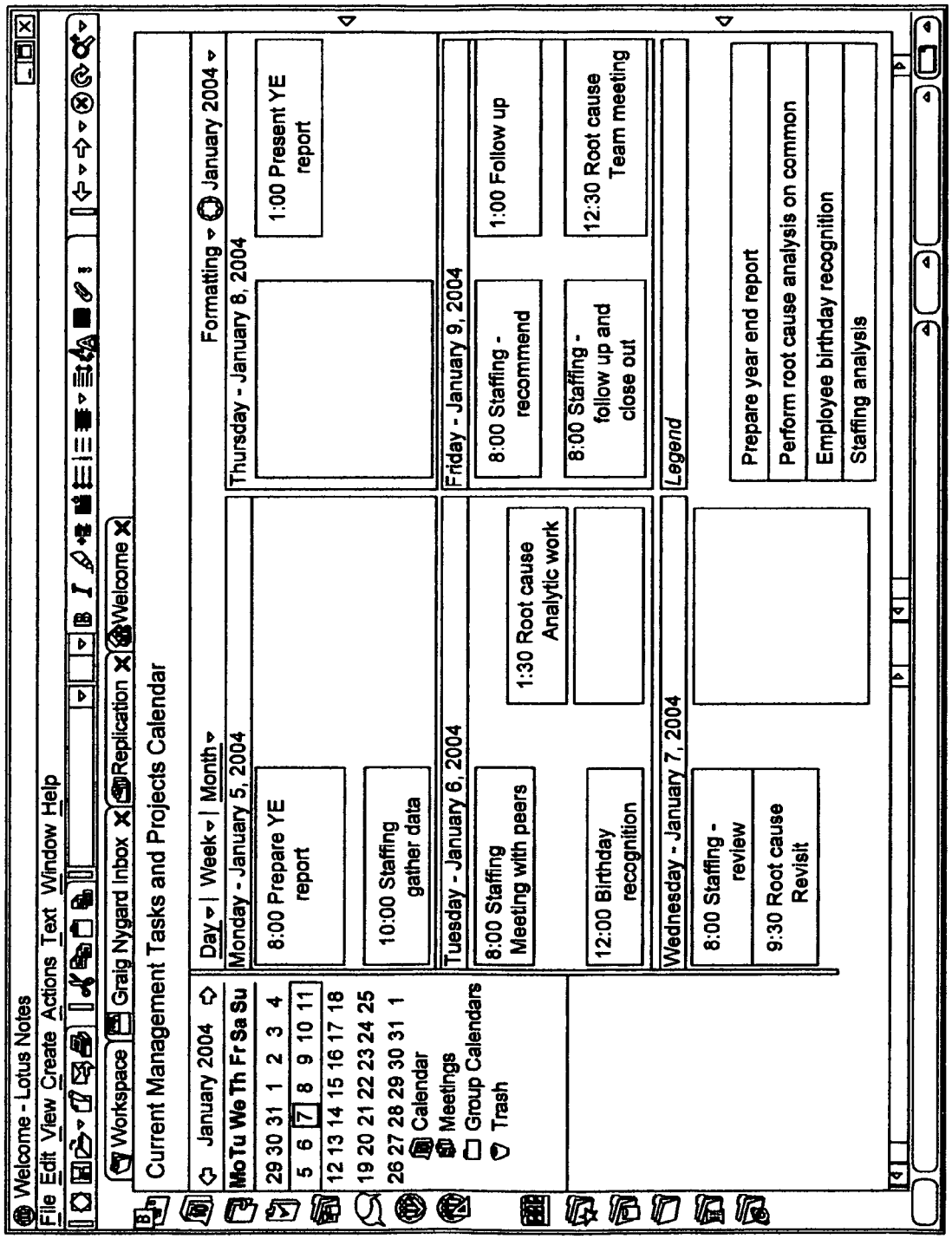
FIG. 12 is a representation of a user's calendar having activities related to existing commitments. As tasks are accepted by the goal engine, both preparation time and post-processing time is included.

FIGS. 11 and 12 illustrate the characteristics of this invention. FIG. 10 depicts the gross flow of information through the goal engine 1101 and goal engine scheduler 1111. Figure highlights a decision tree logic that enables the goal engine 1101 to present only important, relevant events to the user 1121. By operating in this structured way, the user 1121 then becomes more productive because of the decreased number of lower priority interruptions.

FIG. 11, focuses on the ability of the goal engine (1101 of FIG. 10), through disparate devices through their specific adapters, to extend the prioritization and interrupt control to a wide variety of common devices. As new devices present themselves to the environment, additional adapters may be added.

In FIG. 10, above, the goal engine 1101 takes inputs from the computing environment as well as devices 1131 that are rapidly becoming part of the computing environment—TCP/IP addressable phones, instant messengers and mobile platforms. Traditional, heterogeneous computing systems 1133 provide the other main source of input to the goal engine 1101 for consideration. Based on the user's work state, as described below, and the relative priorities of the current and potential work queue 1141, the goal engine 1101 decides to either place the request on the interrupt backlog queue 1143 or to present the interrupt to the user.

For example, if the user is dedicated to a specific task, and an instant message or phone call from a teammate on that task is presented, the goal engine will alert the user to the existence of such an interrupt. Note the subtle difference between presenting the actual interrupt—a phone call or instant message—and the existence of such an interrupt. Most users will instinctively answer the message or phone, but are more like to consider the question "An instant message from a teammate exists; would you like to see it?" more thoughtfully.

Finally, the goal engine 1101 shields the user from all lower priority interrupts through determining if the work priority is higher then the interrupt priority 1141. If not it is added to the backlog queue 1143, but if so 1145, the goal engine determines if the user is available, and if so presents the interrupting event to the user 1149. The logic also determines if the interrupt is task specific 1151, and if the interrupt is associated with the user's task at hand 1153. If so, the task is presented to the user, otherwise it goes to the interrupt backlog queue 1143. The goal engine also includes a do not disturb capability 1155.

FIG. 11 unpacks the gross flow of FIG. 10 another level. This figure shows the overall operating system environment and its two major layers from a user's perspective: the presentation layer (or desktop) 1211 and the application layer (or tools as represented by icons) 1213. This diagram shows the power of integrating at the top of the application layer. First, an External Information Manager 1221 proactively monitors sources that provide input to the user for various tasks. It can look for additions to databases, changes to web pages, arrival of e-mail to any number of accounts and IDs. Second, the integration of the various network attached devices 1223, such as IP phones, into the goal engine 1101 provides an additional layer of integration where applicable. Finally, the Status indicator 1231 is the pervasive state of the user that allows the goal engine 1101 to shield or present interrupts appropriately.

The following discussion refers to the components depicted in FIG. 11. Application Scheduler, 1233. Most employees have a regularly scheduled event that involves a workstation. For example, a lawyer usually fills out a weekly time sheet to record billable hours. It is of interest to the enterprise (the partners in this case), that the billing records arrive weekly so that they have the smallest possible unbilled backlog. The application scheduler component 1233, based on the needs of the partners, would invoke the billable hours application on each lawyer's desktop as appropriate. At the enterprise level, the law firm decides how to prioritize the billable hours application, varying the priority from low to highest the further delinquent the reporting becomes.

The application scheduler 1233, therefore, responds to the goal engine's 1101 prioritization by either starting specific applications at specific times for specific roles or by scheduling one application and preventing others from starting before the enterprise goals are satisfied.

Active Status 1231 (including 1231*a* and 1231*b*). For a long time, phones have had "do not disturb" settings. Some of today's workstation tools, such as Lotus Sametime, have settings for "active", "do not disturb" and "away". However, those states are not shared beyond any single application at this time. This invention proposes two novel extensions to such a model.

First, this setting is bidirectional. The user is able to tell the active status component an overriding status setting under normal circumstances. Conversely, when enterprise goals are compromised, the active status component must be able to override the user's setting.

Second, this setting is pervasive. The active status influences the behavior of a wide range of applications: instant messenger, cell phone, IP based phone, e-mail systems, videoconference systems, and any external representation of the user's state, be it a status board or visual status indicator in the computing environment or real world. In general, the goal engine 1101 will set the status indicator, but provision for a user override is important. Similarly, the user can inform the goal engine 1101 when a task changes from active to complete. For example, after the preparation for a meeting is finished, the user would return to the goal engine prioritization for the next priority.

Role Engine 1243. Most knowledge workers function in a variety of roles for the enterprise. During the course of a day, an individual may function in the role of a manager, a subordinate, a knowledge worker, and even an operative in a process. The act of shifting from role to role for significant periods of time usually requires a different mental and workstation focus. Enterprises lose valuable productivity from these time changes. Therefore, the role engine 1243 does three things:

1. Sense when the enterprise needs a different role from the worker and issue the alert.
2. If the user elects to change or if the goal engine requires a mandatory change, save the state from an existing role
3. Switch the context of applications, files and desktop configuration to the new role This context switching enables those knowledge workers with multiple roles to configure the workstation specifically for the work to be performed.

Enterprise Goal Engine 1241. The enterprise goal engine is both status and role aware. A simple enterprise goal example can demonstrate this. The enterprise sets a goal of having all performance reviews documented by the end of the second quarter. During the early part of the month of June, the user is reminded gently by the enterprise goal engine to document the reviews. By mid-June, the reminders have become alarms. At the end of June, the enterprise goal engine will override any status or role to place the nearly delinquent manager into the right role and state until the documentation is complete. Upon completion of the goal, the enterprise goal engine returns the user to the prior role and state.

The enterprise goal engine 1241 is aware of the user's commitments based on a calculation of the time associated with the task, the time already allocated to the task and the time available to be allocated to the task.

The following represents a sample of the types of inputs presented to the enterprise goal engine:
  Meeting notices
  Project management files
  Regular personal or enterprise events such as balancing the checkbook or recording billable time in the company's billing system
  Specific due dates from unique systems
  User recorded "to do" items from phone or casual conversation
  Requests from superiors
  Requests from subordinates
  Requests for electronic signatures or approvals The user's calendar becomes the key object for processing requests, scheduling requests and prioritizing the assignment of scarce resource. It is expected that many requests will be rescheduled due to changing enterprise priorities. If they cannot be extended, the user will be allowed to indicate that the gap will be closed with overtime or that the gap cannot be closed. If the latter is true, the enterprise goal engine will communicate with the requester of the work item.

The enterprise goal engine 1241 is configured from two places. First, the user performs configuration activities using a Control Panel. The enterprise performs goal setting activities using an Enterprise Control Panel. These goals are delivered to the user through existing software delivery tools. The enterprise level goals should be maintained by the enterprise application owner. Similar ownership and maintenance responsibilities accrue to each level of application, knowledge database or team room tasks.

External Information Manager 1221. Many of the needs of a knowledge worker come from sources outside the enterprise. To meet these needs and focus on the goals of the enterprise, the external information manager component performs three functions:

1. Examines external content sources for updates
2. Relates these to the enterprise goals and conveys them to the user through the role and state based paradigm governed by the enterprise goal engine.
3. Processes goal settings from the various control panels.

For example, it might be argued that a peek at The Late Show with David Letterman Top Ten list can improve productivity by improving the social interaction among peers that encourages subsequent enterprise-specific knowledge sharing. It can clearly be argued that such content is not high priority. On the other hand, a news report from The New York Times about a merger involving a major client must be presented quickly to the user.

The enterprise goal engine 1241, therefore, sorts the changed content from the external information manager into high priority information in support of enterprise goals and low priority information that only indirectly supports enterprise goals and presents them to the active status engine for communication.

Application Adapters 1261. Like the External Information Manager, the Application Adapters provide valuable, specific functions to the enterprise goal engine.

1. Examines specific applications for specific events
2. Relates these to the enterprise goals and conveys them to the user through the role and state based paradigm governed by the enterprise goal engine.

For example, suppose that the problem management system has received a top severity problem report assigned to this user. Also assume that the enterprise priority settings require such problem reports to be delivered instantly to the owning technician. As the application adapter presents this to the enterprise goal engine, the engine announces the arrival of the interrupt to the user immediately. As the user accepts this interrupt, the engine also saves the prior state and task activities (for later reinstatement) and then switches to the problem management workstation configuration.

Setting goals. This invention preferably has multiple goal setting entry points. First, enterprise application owners much have the capability and authority to set enterprise wide goals.

FIG. 12 is a representation of a calendar application screen. The user's calendar has activities related to existing commitments. As tasks are accepted by the goal engine, both preparation time and post-processing time is included. This is illustrated by the calendar illustrated in FIG. 12. Note that the activity "staffing" has five different calendar entries to reflect the process steps, including follow up. Since a user's day is a combination of planned and unplanned activities, the goal engine provides a disciplined approach to meeting existing commitments and, based on priority and free time, allowing interrupts for high priority unplanned tasks.

The invention may be implemented, for example, by having the system for Prioritizing workload and tasks by first determining if a prioritization state change is necessary, and if so setting priorities to change the prioritization state, and if not examining prioritization state determining inputs, calculating new prioritization states, and updating prioritization states as a software application, in a dedicated processor or set of processors, or in a dedicated processor or dedicated processors with dedicated code. The code executes a sequence of machine-readable instructions, which can also be referred to as code. These instructions may reside in various types of code-bearing media. In this respect, one aspect of the present invention concerns a program product, comprising a code-bearing medium or code-bearing media tangibly embodying a program of machine-readable instructions executable by a digital processing apparatus to perform a method for searching, extracting, transforming, loading, and presenting priority data from a database management system as a software application.

This code-bearing medium may comprise, for example, memory in a server. The memory in the server may be non-volatile storage, a data disc, or even memory on a vendor server for downloading to a processor for installation. Alternatively, the instructions may be embodied in a code-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch and/or cards. As an example, the machine-readable instructions may comprise software object code, compiled from a language such as "C++", Java, Pascal, ADA, assembler, and the like.

Additionally, the program code may, for example, be compressed, encrypted, or both, and may include executable code, script code and wizards for installation, as in Zip code and cab code. As used herein the term machine-readable instructions or code residing in or on code-bearing media include all of the above means of delivery.

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

I claim:

1. A computer-implemented method for prioritizing workloads, the computer-implemented method comprising:
   determining if a change to a present prioritization state for a task is necessary;
   in response to determining that the change to the present prioritization state is necessary, calculating a new prioritization state based on prioritization state determining inputs that are selected from a group consisting of enterprise priorities, parsed e-mail, collaboration inputs, calendars, work in progress, and personal inputs, wherein the personal inputs are selected from a group consisting of e-banking data, e-trading data, e-commerce data, and health provider data;
   processing user interruptions using the new prioritization state;
   changing a future prioritization state as a function of the present prioritization state and the calculated new prioritization state; and
   forcing use of the future prioritization state on future tasks.

2. The computer-implemented method of claim 1, further comprising:
   comparing the new prioritization state with the present prioritization state; and
   changing prioritization states as a function of the present prioritization state and the calculated new prioritization state.

3. The computer-implemented method of claim 2, wherein changing prioritization states as a function of the present prioritization state and the calculated new prioritization state is based on one or more of the following rules:
   if the present prioritization state is ordinary and the calculated new prioritization state is ordinary then updating the task list;
   if the present prioritization state is on a task and the calculated new prioritization state is ordinary then no change;
   if the present prioritization state is do not disturb and the calculated new prioritization state is ordinary then no change;
   if the present prioritization state is mandatory focused and the calculated new prioritization state is ordinary then no change;
   if the present prioritization state is ordinary and the calculated new prioritization state is on a task then updating the task list;
   if the present prioritization state is on a task and the calculated new prioritization state is on a task then updating task list;
   if the present prioritization state is do not disturb and the calculated new prioritization state is on a task then no change;
   if the present prioritization state is mandatory focused and the calculated new prioritization state is on a task then no change;
   if the present prioritization state is ordinary and the calculated new prioritization state is do not disturb then send a message describing the requested interrupt;
   if the present prioritization state is on a task and the calculated new prioritization state is do not disturb then send a message describing the requested interrupt;

if the present prioritization state is do not disturb and the calculated new prioritization state is do not disturb then send a message describing the requested interrupt;

if the present prioritization state is mandatory focused and the calculated new prioritization state is do not disturb then no change;

if the present prioritization state is ordinary and the calculated new prioritization state is mandatory focused then switch to the required interrupt;

if the present prioritization state is on a task and the calculated new prioritization state is mandatory focused then switch to the required interrupt;

if the present prioritization state is do not disturb and the calculated new prioritization state is mandatory focused then switch to the required interrupt; and if the present prioritization state is mandatory focused and the calculated new prioritization state is mandatory focused then send a message describing the requested interrupt.

4. The computer-implemented method of claim 1, wherein the future prioritization state is changed as a function of the present prioritization state and the calculated new prioritization state using "if-then" logic.

5. The computer-implemented method of claim 1, wherein the future prioritization state is changed as a function of the present prioritization state and the calculated new prioritization state using state space logic.

6. The computer-implemented method of claim 1, wherein the future prioritization state is changed as a function of the present prioritization state and the calculated new prioritization state using combinatorial logic.

7. A computer system comprising:
a central processing unit (CPU), a computer readable memory, and a computer readable storage media;
first program instructions for determining if a change to a present prioritization state for a task is necessary;
second program instructions for, in response to determining that the change to the present prioritization state is necessary, calculating a new prioritization state;
third program instructions for processing interrupts using the new prioritization state;
fourth program instructions for examining present settings and prioritization states, calculating new prioritization states, comparing the new prioritization states with existing prioritization states, and changing prioritization states as a function of present prioritization states and calculated new prioritization states; and
fifth program instructions for either forcing a new prioritization state, or saving existing prioritization states and roles and saving the prioritization state, wherein changing prioritization states as a function of present prioritization states and calculated prioritization states is based on one or more of the following rules;

if the present prioritization state is ordinary and the calculated new prioritization state is ordinary then updating the task list;

if the present prioritization state is on a task and the calculated new prioritization state is ordinary then no change;

if the present prioritization state is do not disturb and the calculated new prioritization state is ordinary then no change;

if the present prioritization state is mandatory focused and the calculated new prioritization state is ordinary then no change;

if the present prioritization state is ordinary and the calculated new prioritization state is on a task then updating the task list;

if the present prioritization state is on a task and the calculated new prioritization state is on a task then updating task list;

if the present prioritization state is do not disturb and the calculated new prioritization state is on a task then no change;

if the present prioritization state is mandatory focused and the calculated new prioritization state is on a task then no change;

if the present prioritization state is ordinary and the calculated new prioritization state is do not disturb then send a message describing the requested interrupt;

if the present prioritization state is on a task and the calculated new prioritization state is do not disturb then send a message describing the requested interrupt;

if the present prioritization state is do not disturb and the calculated new prioritization state is do not disturb then send a message describing the requested interrupt;

if the present prioritization state is mandatory focused and the calculated new prioritization state is do not disturb then no change;

if the present prioritization state is ordinary and the calculated new prioritization state is mandatory focused then switch to the required interrupt;

if the present prioritization state is on a task and the calculated new prioritization state is mandatory focused then switch to the required interrupt;

if the present prioritization state is do not disturb and the calculated new prioritization state is mandatory focused then switch to the required interrupt; and if the present prioritization state is mandatory focused and the calculated new prioritization state is mandatory focused then send a message describing the requested interrupt, and wherein said first, second, third, fourth, and fifth program instructions are stored on said computer readable storage media for execution by said CPU via said computer readable memory.

8. The computer system of claim 7, wherein future prioritization states are changed as a function of the present prioritization state and the calculated new prioritization state using "if-then" logic.

9. The computer system of claim 7, wherein future prioritization states are changed as a function of the present prioritization state and the calculated new prioritization state using state space logic.

10. The computer system of claim 7, wherein future prioritization states are changed as a function of the present prioritization state and the calculated new prioritization state using combinatorial logic.

11. The computer system of claim 7, wherein prioritization state determining inputs are selected from a group consisting of enterprise priorities, parsed e-mail, collaboration inputs, calendars, work in process, and personal inputs.

12. The computer system of claim 11, wherein the personal inputs are selected from a group consisting of e-banking data, e-trading data, e-commerce data, and health provider data.

13. A computer program product for prioritizing workloads. the computer program product comprising:
a computer readable storage media;
first program instructions to determine if a change to a present prioritization state is necessary, and if so setting priorities to change the prioritization state, else examining prioritization state determining inputs, calculating new prioritization states, and updating prioritization states;
second program instructions to process interrupts and to update prioritization states;

third program instructions to examine present settings and prioritization states, to calculate new prioritization states, to compare the new prioritization states with existing prioritization states, and to change prioritization states as a function of present prioritization states and calculated new prioritization states; and fourth program instructions to either force a new prioritization state, or to save existing prioritization states and roles and to save the prioritization state, wherein said prioritization states are changed according to one or more the following rules:

if the present prioritization state is ordinary and a calculated new prioritization state is ordinary then updating the task list;

if the present prioritization state is on a task and a calculated new prioritization state is ordinary then no change;

if the present prioritization state is do not disturb and a calculated new prioritization state is ordinary then no change;

if the present prioritization state is mandatory focused and a calculated new prioritization state is ordinary then no change;

if the present prioritization state is ordinary and a calculated new prioritization state is on a task then updating the task list;

if the present prioritization state is on a task and a calculated new prioritization state is on a task then updating task list;

if the present prioritization state is do not disturb and a calculated new prioritization state is on a task then no change;

if the present prioritization state is mandatory focused and a calculated new prioritization state is on a task then no change;

if the present prioritization state is ordinary and a calculated new prioritization state is do not disturb then send a message describing the requested interrupt;

if the present prioritization state is on a task and a calculated new prioritization state is do not disturb then send a message describing the requested interrupt;

if the present prioritization state is do not disturb and a calculated new prioritization state is do not disturb then send a message describing the requested interrupt;

if the present prioritization state is mandatory focused and a calculated new prioritization state is do not disturb then no change;

if the present prioritization state is ordinary and a calculated new prioritization state is mandatory focused then switch to the required interrupt;

if the present prioritization state is on a task and a calculated new prioritization state is mandatory focused then switch to the required interrupt;

if the present prioritization state is do not disturb and a calculated new prioritization state is mandatory focused then switch to the required interrupt; and if the present prioritization state is mandatory focused and a calculated new prioritization state is mandatory focused then send a message describing the requested interrupt, and wherein the first, second, third and fourth program instructions are stored on the computer readable storage media.

14. The computer program product of claim 13, wherein future prioritization states are changed as a function of the present prioritization state and the calculated new prioritization state using "if-then" logic.

15. The computer program product of claim 13, wherein future prioritization states are changed as a function of the present prioritization state and the calculated new prioritization state using state space logic.

16. The computer program product of claim 13, wherein future prioritization states are changed as a function of the present prioritization state and the calculated new prioritization state using combinatorial logic.

17. The computer program product of claim 13, wherein said prioritization state determining inputs are selected from a group consisting of enterprise priorities, parsed e-mail, collaboration inputs, calendars, work in process, and personal inputs.

18. The computer program product of claim 17, wherein the personal inputs are selected from a group consisting of e-banking data, e-trading data, e-commerce data, and health provider data.

* * * * *